(12) United States Patent
Brunone

(10) Patent No.: US 7,967,130 B2
(45) Date of Patent: Jun. 28, 2011

(54) SUPPORT STATION FOR A BELT CONVEYOR AND CORRESPONDING CONVEYOR

(76) Inventor: René Brunone, Saint-Marcel (FR)

( * ) Notice: Subject to any disclaimer, the term of this patent is extended or adjusted under 35 U.S.C. 154(b) by 27 days.

(21) Appl. No.: 12/644,077

(22) Filed: Dec. 22, 2009

(65) Prior Publication Data
US 2010/0155198 A1 Jun. 24, 2010

(30) Foreign Application Priority Data
Dec. 22, 2008 (FR) ...................... 08 58901

(51) Int. Cl.
*B65G 15/08* (2006.01)
(52) U.S. Cl. ...................... 198/825; 198/828
(58) Field of Classification Search ................ 198/818, 198/824–830, 841, 497
See application file for complete search history.

(56) References Cited

U.S. PATENT DOCUMENTS

| | | | | |
|---|---|---|---|---|
| 3,217,862 A * | 11/1965 | Herrmann | | 198/828 |
| 3,360,105 A * | 12/1967 | Pelzer | | 198/825 |
| 5,103,967 A * | 4/1992 | Stoll | | 198/823 |
| 5,694,523 A | 12/1997 | Wical | | |
| 5,799,780 A * | 9/1998 | Steeb et al. | | 198/823 |
| 5,826,703 A * | 10/1998 | Altemus et al. | | 198/823 |
| 7,325,673 B2 * | 2/2008 | Kotaki et al. | | 198/823 |
| 7,530,450 B2 * | 5/2009 | Brunone | | 198/825 |
| 2004/0124069 A1 * | 7/2004 | Benjamin | | 198/827 |
| 2007/0246330 A1 | 10/2007 | Brunone | | |

FOREIGN PATENT DOCUMENTS

| | | |
|---|---|---|
| DE | 19610624 | 9/1997 |
| EP | 0416201 | 3/1991 |
| FR | 2782991 | 3/2000 |
| FR | 2900139 | 10/2007 |
| JP | 5-035732 U | 5/1993 |

OTHER PUBLICATIONS

French Search Report dated Jul. 20, 2009 from FR0858901.
French Search Report, dated Jul. 10, 2009.

* cited by examiner

*Primary Examiner* — James R Bidwell
(74) *Attorney, Agent, or Firm* — Young & Thompson

(57) ABSTRACT

A support station (9) for a movable belt conveyor includes:
a support cradle (17) for the belt (3), the cradle (17) including at least one roller (31, 33) for guiding and supporting the belt (3);
a frame (15) for supporting the or each roller (31,33);
at least one anti-jamming protection element (35, 37) fixed to the frame (15), the protection element (35, 37) being disposed along at least one of the rollers (31, 33) and having an elongate shape longitudinally substantially parallel to a generatrix of the roller (31, 33), characterized in that the protection element (37) includes at least first and second longitudinal profile sections (41, 43) having respectively first and second cross-sections that are different from each other.

10 Claims, 4 Drawing Sheets

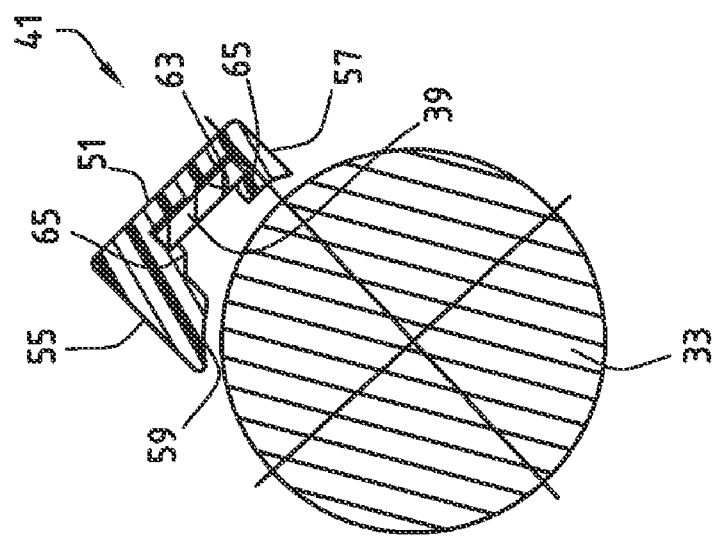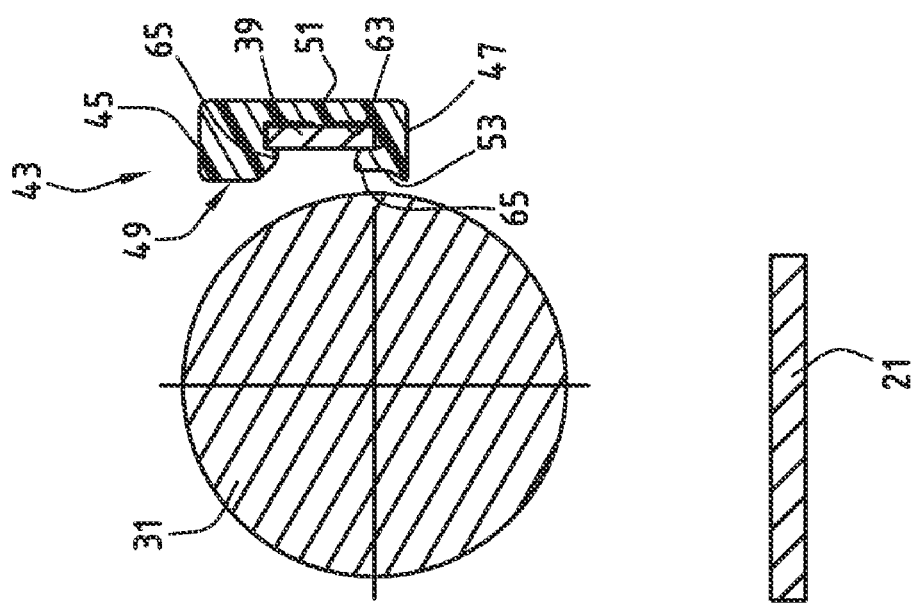

SUPPORT STATION FOR A BELT CONVEYOR AND CORRESPONDING CONVEYOR

The invention in general concerns belt conveyors. More precisely, the invention concerns a support station for a movable belt conveyor, of the type comprising:

- A cradle for supporting the belt, the cradle comprising at least one roller for guiding and supporting the belt;
- A frame for supporting each roller at the top;
- At least one anti-jamming protection means fixed to the frame, the protection means being disposed along at least one of the rollers and having an elongate shape longitudinally substantially parallel to a generatrix of the roller.

Such a support station is described in the application filed under the number FR 06 03579. The anti-jamming protection means is a profile section curved to follow the curvature of the guide cradle. The profile section has a long blade and a sheath surrounding the long blade. The protection means is fixed to the frame via plates screwed beneath the feet of the frame.

Lowering manufacturing costs is a constant concern in the industry.

In this context, the invention aims to propose a support station which is more economic.

To this end, the invention relates to a support station of the aforesaid type, characterized in that the protection means comprises first and second longitudinal profile sections having respectively first and second cross-sections that are different from each other.

The support station may also have one or more of the following features, taken individually or in all technically possible combinations:

- the first and second profile sections are made of a plastics material;
- the first and second profile sections are disposed respectively towards the outside and towards the centre of the support station, and have faces turned towards the belt that are respectively relatively wider and relatively less wide;
- the faces, turned towards the belt, of the first and second profile sections are separated from the roller by gaps that are respectively relatively narrower and relatively wider;
- the protection means comprises a longitudinal metal core, the profile sections being clipped onto the metal core;
- each profile section has a face turned towards the roller and a seat for receiving the metal core and open on the face turned towards the roller;
- the frame comprises two support notches for the protection means, disposed longitudinally on either side of the protection means, the notches being each delimited by an open peripheral edge, the opposed end portions of the core being engaged in the notches;
- at least one of the end portions of the core protrudes out of the notch and is bent with respect to the longitudinal direction;
- the metal core is a solid iron bar of flat cross-section;
- the cradle includes at least one central roller and two end rollers which are disposed on either side of the central roller, the rollers being disposed in prolongation of one another, the station including for each of the two end rollers a protection means equipped with two longitudinal profile sections having different cross-sections from each other, and for each central roller a protection means equipped with a single profile section.

Other characteristics and advantages of the invention will become clearer from the following detailed description, provided by way of non-limiting example, with reference to the appended drawings, in which:

FIGS. 4 and 5 are sectional views of the station of FIG. 2, viewed respectively in the direction of the arrows IV and V.

Figure 1:
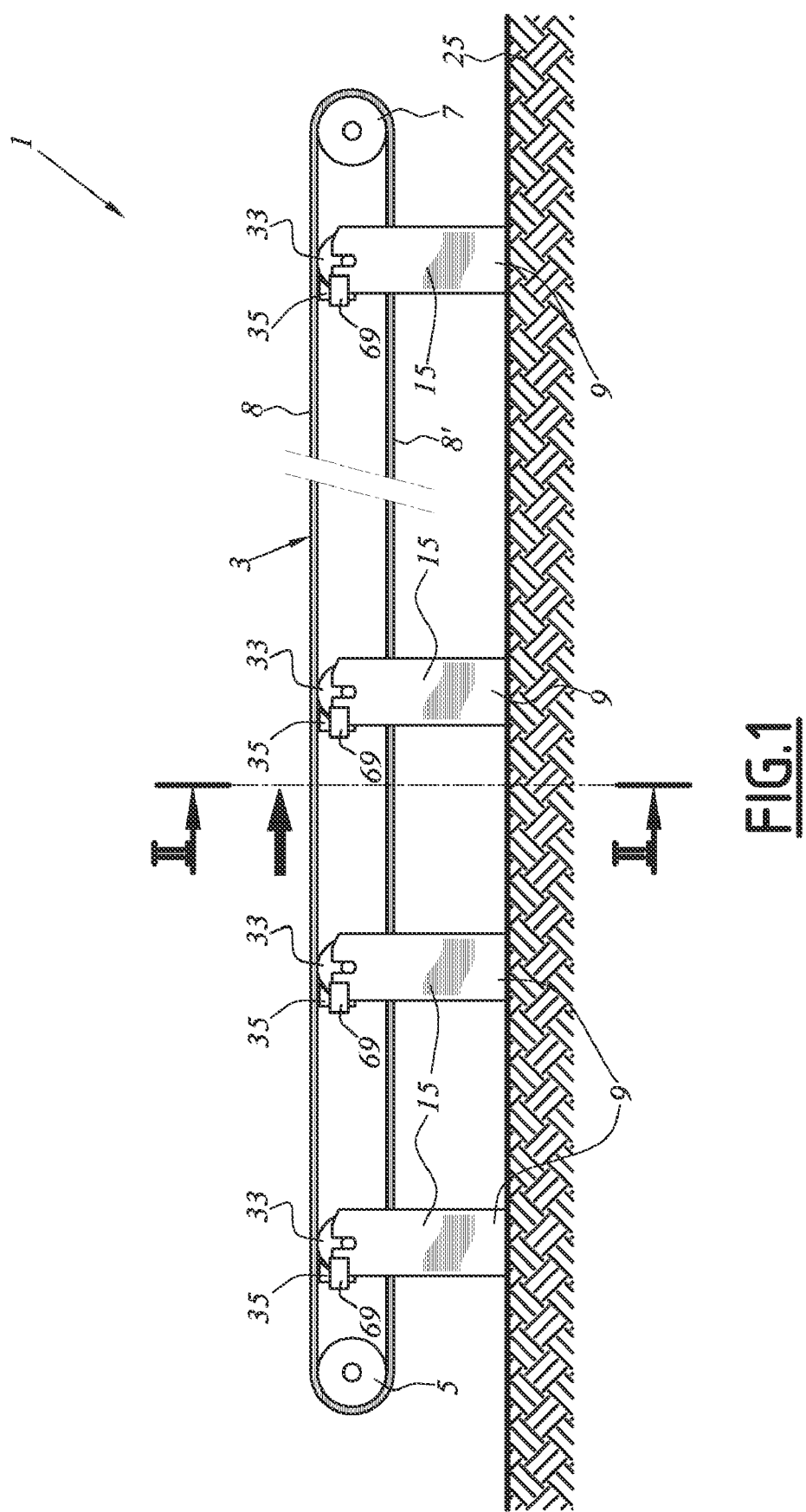
FIG. 1 is a schematic profile view of a belt conveyor supported by roller stations conforming to the invention.

The conveyor 1 shown in FIG. 1 is intended for example for the transport of ores from a quarry. It comprises a conveyor belt 3 formed into a loop and engaged at its ends about two return rollers 5 and 7. One of the two rollers 5 is a drive roller for driving the belt 3, thus defining the upstream side of the belt 3. The loop is thus divided into an upper section 8 for transporting the ore and a lower return section 8'.

The belt 3, along the upper section 8, is supported over its length by a plurality of stations 9 for supporting and guiding the belt 3. The stations 9 are for example all identical.

Figure 2:
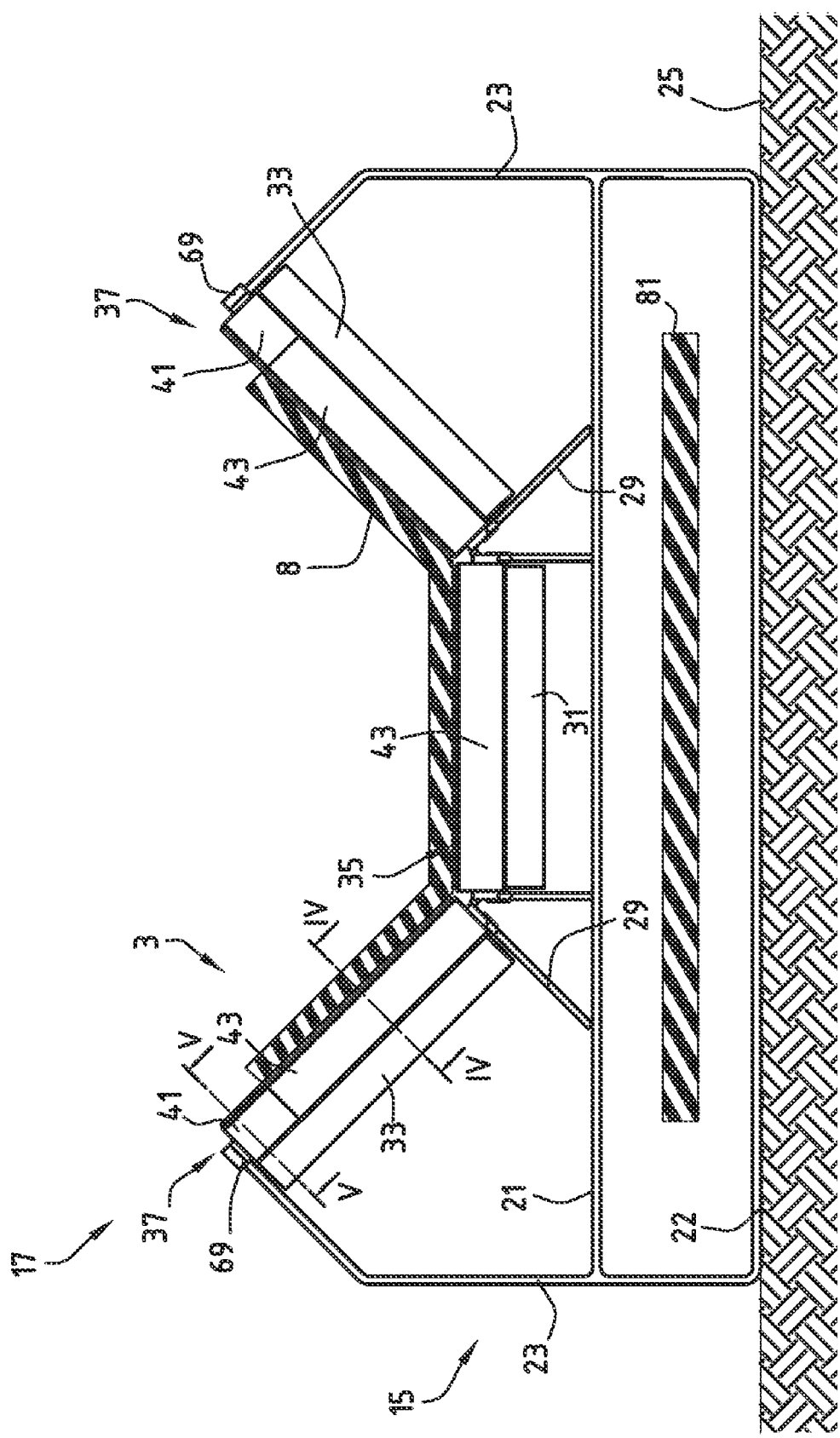
FIG. 2 is a front view of the support station of FIG. 1.

As shown in FIG. 2, each station 9 comprises a metal support frame 15 and a cradle 17 for supporting and guiding the belt 3. The frame 15 fundamentally comprises transverse beams, upper 21 and lower 22, and two legs 23 for support on the ground 25, on each side of the belt 3. The transverse beams 21 and 22 connect the two legs 23. The frame 15 is placed directly on the ground 25, by the lower beam 22.

The upper and lower beams 21 and 22 are spaced vertically, and the lower section 8' of the belt 3 passes between the two beams.

The frame 15 comprises two roller support brackets 29. The brackets 29 are formed of bent metal plates, the ends of which are fixed to the upper transverse beam 21 of the frame 15.

A horizontal lower central roller 31 and two inclined lateral rollers 33 are mounted to be movable in rotation between the support brackets 29 and the legs 23 of the frame 15. The rollers 31 and 33 extend in the same vertical plane and are suitable for receiving the belt 3 and deforming the latter into a trough shape.

Figure 3:
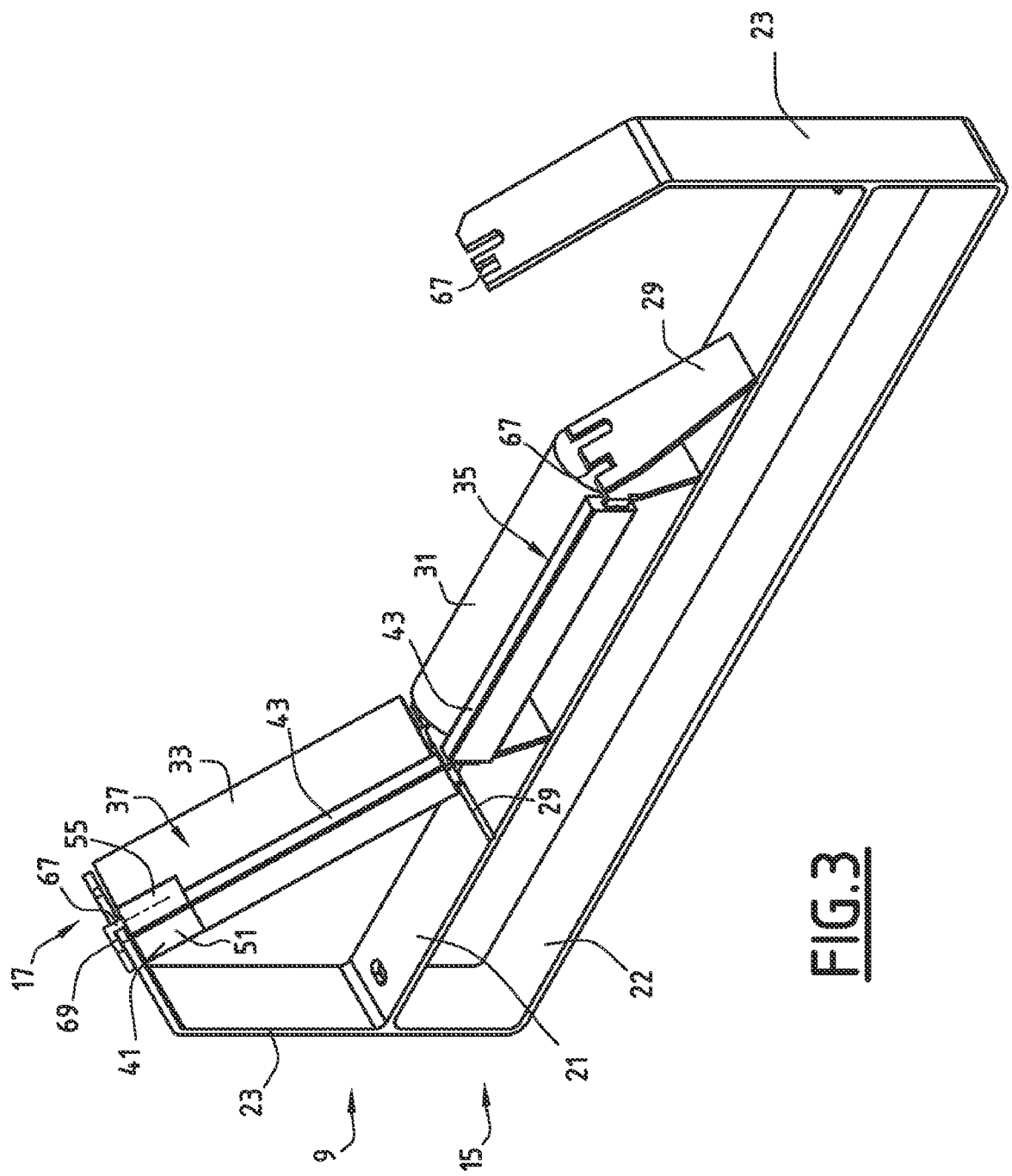
FIG. 3 is a perspective view of the support station of FIG. 2, one of the rollers not being represented.

On the upstream side of the support station 9, anti-jamming protection means 35, 37, visible in FIG. 3, mask the angle termed re-entrant, formed by the belt 3 and each support roller 31 and 33.

The anti-jamming protection means 37 of the lateral rollers are different from the anti-jamming protection means 35 of the central roller.

Each of the two protection means 37 fundamentally comprises a metal central core 39 and first and second profile sections 41 and 43 clipped onto the central core.

The central core 39 is a solid iron bar, of flat cross-section, as can be seen in FIGS. 4 and 5.

The profile sections 41 and 43 are made of a plastics material, for example of polyethylene. They have, respectively, first and second cross-sections that are different from each other. The cross-section of the first profile section is shown in FIG. 5, and the cross-section of the second profile section is shown in FIG. 4.

Each protection means is disposed along the corresponding roller, and is elongate longitudinally substantially parallel to the generatrix of the roller.

Each profile section 41, 43 has a constant cross-section perpendicularly to the longitudinal direction.

The profile section 43, in a plane perpendicular to the longitudinal direction, has a substantially rectangular cross-section, as can be seen in FIG. 4. It is delimited by faces 45, 47, 49 and 51. The faces 45 and 47 are respectively turned towards the belt and away from the belt. The faces 49 and 51 are respectively turned towards the roller 33 and away from the roller. The face 49 has a slightly arched lower area 53, so as to follow the curvature of the roller. The area 53 adjoins the face 47. It is spaced slightly from the roller 33. The area of the face 49 adjoining the face 45 is flat, and is spaced further away from the roller 33 than is the area 53.

As illustrated in FIG. 5, the profile section 41 is delimited by four faces, respectively 55, 57, 59 and 61. The faces 55 and 57 are turned respectively towards the section 8 of the belt and away from the section 8. The faces 59 and 61 are turned respectively towards the roller and away from the roller. The face 55 is relatively wider than the face 57. The width in this case means the size of the faces in a plane perpendicular to the longitudinal direction. Similarly, the face 55 is wider than the face 45, turned towards the section 8, of the profile section 43.

As a consequence, the face 55 is separated from the roller 33 by a gap which is relatively narrower than the gap separating the face 45 from said roller 33.

The face 59 is arched both in the area adjoining the face 55 and in the area adjoining the face 57. It follows the contour of the roller 33 substantially over the whole of its surface. Thus, the face 59 follows the shape of the roller 33 over a greater angular sector of the roller than the face 49 of the profile section 43.

The area of the face 59 adjoining the face 55 is separated from the roller by a gap substantially equal to that separating the roller from the area adjoining the face 57.

The profile sections 41 and 43 are disposed side by side along the core 39. The profile section 41 is disposed on the same side as the leg 23, and the profile section 43 is disposed on the same side as the bracket 29. Together, they extend substantially over the whole length of the roller 33.

The profile sections 41 and 43 are fixed to the core 39 by clipping. They are not fixed directly to the leg 23 nor to the support bracket 29. They are not fixed directly to each other.

In order to permit clipping onto the metal core, each of the profile sections has on its face turned towards the roller a seat 63 for receiving said core. The seat 63 has a shape matched to that of the core 39. The seat 63 is open in the region of the face 59, 49 turned towards the roller. The opening is of a shape suitable for permitting the engagement of the core 39 inside the seat 63.

On either side of the opening of the seat, resiliently deformable reliefs 65 for locking the core 39 inside the seat 63 are formed.

According to another aspect of the invention, independent of the preceding aspects, the leg 23 and the bracket 29 each have a notch 67, opposed end portions 69 of the metal core being engaged in the notches in order to fix the protection means to the frame. The notches 67 are each delimited by a peripheral edge open in an upward direction. They are longitudinally aligned with each other.

The end portion 69 of the core engaged in the notch of the leg 23 protrudes out of the notch. The protruding portion is bent with respect to the longitudinal direction, for example in a direction perpendicular thereto.

The two end portions 69 are welded, one to the leg 23 and the other to the bracket 29.

The protection means 35 of the roller 31 is slightly different from the protection means 37 that are associated with the end rollers 33.

The protection means 35 of the central roller comprises a metal central core and a single profile section. The central core is an iron bar similar to that of the protection means 37 of the lateral rollers. The profile section is similar to the profile section 43 of the lateral rollers. It extends over the whole longitudinal extent of the roller 31.

The end portions of the metal core are engaged in notches similar to the notches 67 described above, provided in the two brackets 29 disposed on either side of the central roller 31. The end portions of the metal core are not bent. They are engaged in the notches 67 and welded to the two brackets 29.

The mounting of the different protection means on the support frame can be carried out very simply. The protection means 35 of the central roller is mounted by first raising the section 8 of the belt, and by engaging the two opposed end portions of the central core in the notches 67 provided on the two support brackets 29 to receive the metal core. The two end portions are then welded onto the brackets 29.

The protection means 35 of the lateral rollers 33 are each mounted by raising the section 8 of the belt, by engaging an end portion of the metal core of the protection means in the notch 67 of the support bracket 29, then by engaging the other end portion of the metal core in the notch 67 of the leg 23. The latter end portion then protrudes towards the outside of the support with respect to the notch 67, in the longitudinal direction. The protruding portion is then bent by means of a sledge hammer, substantially perpendicularly to the longitudinal direction. The two end portions 69 of the metal core are then welded, one onto the bracket 29 and the other onto the leg 23.

The support station described above has numerous advantages.

Owing to the fact that the protection means comprises first and second longitudinal profile sections having respectively first and second cross-sections that are different from each other it is possible to have, along the same roller, areas in which the anti-jamming protection is more complete, and areas in which the anti-jamming protection is less complete. Preferably, the anti-jamming protection is reinforced in proximity to the legs of the support frame, that is to say, in the areas in which interventions by operators are most frequent.

Thus, in the area in which the operators intervene only rarely, it is possible to use a profile section of smaller cross-section. Material is thus saved, so that the support station is more economic to manufacture.

The first and second profile sections may be manufactured very conveniently from a plastics material, for example polyethylene, in particular by extrusion.

It is advantageous to provide for the profile section located towards the outside of the support station to comprise a face turned towards the belt which is wider than that located towards the centre of the support station. The profile section located towards the centre of the support station is entirely covered by the belt, such that the risk of an operator introducing a finger between the roller and the profile section from above is extremely reduced. However, as shown in FIG. 2, the profile section located towards the outside of the support is not entirely covered by the belt. There is therefore a greater risk of an operator sliding a finger between the face of said profile section turned towards the belt and the roller. Consequently, a narrower gap is provided between the roller and the face, turned towards the belt, of the profile section located at the outside, and a wider gap between the roller and the face, turned towards the belt, of the profile section located towards the centre of the support station.

As indicated above, according to a second aspect of the invention, independent of the first, each protection means is obtained in a particularly economic manner by clipping the profile sections onto the metal core. The assembly of the core and of the profile sections is particularly easy. Clipping is carried out in an extremely simple and rapid manner owing to the fact that the seat for receiving the metal core is open on one of the faces of each profile section.

According to yet another aspect of the invention, independent of the first two, the mounting of each protection means on the support frame is particularly easy, since the end portions of the metal core are engaged in notches provided on the frame, the notches each being delimited by an open peripheral edge. The locking of the protection means is particularly effective, owing to the fact that one of the end portions of the metal core is bent with respect to the longitudinal direction. Bending is achieved very conveniently by means of a sledge hammer, after engagement of the metal core in the notches. Bending is facilitated by the fact that the metal core is an iron bar of flat cross-section.

The support station described above may have numerous variants.

The support cradle may comprise a single roller, the support station then comprising a single anti-jamming protection means. In this case it is advantageous to provide for the protection means to comprise three profile sections, two profile sections of larger cross-section at the ends, such as the profile section 41 described above, and a profile section of smaller cross-section at the centre, such as the profile section 43 described above.

The cradle may further comprise two rollers, and two protection means. In this case, each of the two protection means comprises a profile section of larger cross-section towards the outside of the support, and a profile section of smaller cross-section towards the centre of the support.

The cradle may comprise more than three rollers, for example four, five or more than five rollers. In this case, the protection means that are associated with all the central rollers preferably comprise only a single profile section, of the same type as the profile section 43 of smaller cross-section described above.

At all events, the protection means associated with any roller may comprise two, three or more than three profile sections having cross-sections that are different from one another, according to requirements.

The profile sections may be made of all kinds of materials, and are not necessarily made of a plastics material.

The core of each protection means is not necessarily metallic.

The profile sections of larger and smaller cross-section may have all kinds of shapes, and not necessarily have the cross-sections shown in FIGS. 4 and 5.

The invention claimed is:

1. Support station for a movable belt conveyor, the support station (9) comprising:
    a support cradle (17) for the belt (3), the cradle (17) comprising at least one roller (31, 33) for guiding and supporting the belt (3);
    a frame (15) for supporting the or each roller (31, 33);
    at least one anti-jamming protection means (35, 37) fixed to the frame (15), the protection means (35, 37) being disposed along at least one of the rollers (31, 33) and having an elongate shape longitudinally substantially parallel to a generatrix of the roller (31, 33), characterized in that the protection means (37) comprises at least first and second longitudinal profile sections (41, 43) having respectively first and second cross-sections different from each other, and in that the protection means (37) comprises a longitudinal metal core (39), the profile sections (41, 43) being clipped onto the metal core (39).

2. A support station according to claim 1, characterized in that the first and second profile sections (41, 43) are made of a plastics material.

3. A support station according to claim 1, characterized in that the first and second profile sections (41, 43) are disposed respectively towards the outside and towards the centre of the support station (9) and have faces (55, 45) turned towards the belt (3) that are respectively relatively wider and relatively less wide.

4. A support station according to claim 3, characterized in that the faces (55, 45), turned towards the belt (3), of the first and second profile sections (41, 43) are separated from the roller (33) by gaps that are respectively relatively narrower and relatively wider.

5. A support station according to claim 1, characterized in that each profile section (41, 43) has a face (59, 49) turned towards the roller (33) and a seat (63) for receiving the metal core (39) open on the face (59, 49) turned towards the roller (33).

6. A support station according to claim 1, characterized in that the frame (15) comprises two support notches (67) for the protection means (37) that are disposed longitudinally on either side of the protection means (37), the notches (67) being each delimited by an open peripheral edge, the opposed end portions (69) of the core (39) being engaged in the notches (67).

7. A support station according to claim 6, characterized in that at least one of the end portions (69) of the core (39) protrudes out of the notch (67) and is bent with respect to the longitudinal direction.

8. A support station according to claim 1, characterized in that the metal core (39) is a solid iron bar of flat cross-section.

9. A support station according to claim 1, characterized in that the cradle (17) comprises at least one central roller (31) and two end rollers (33) disposed on either side of the central roller (31), the rollers (31, 33) being disposed in prolongation of each other, and the station comprising for each of the two end rollers (33) a protection means (37) equipped with two longitudinal profile sections (41, 43) having cross-sections that are different from each other, and for each central roller (31) a protection means (35) equipped with a single profile section (43).

10. A support station according to claim 2, characterized in that the first and second profile sections (41, 43) are disposed respectively towards the outside and towards the centre of the support station (9) and have faces (55, 45) turned towards the belt (3) that are respectively relatively wider and relatively less wide.

* * * * *